(12) United States Patent
Regaard

(10) Patent No.: US 10,717,151 B2
(45) Date of Patent: Jul. 21, 2020

(54) LASER-PROCESSING HEAD AND LASER-PROCESSING MACHINE COMPRISING SAME

(71) Applicant: TRUMPF Werkzeugmaschinen GmbH + Co. KG, Ditzingen (DE)

(72) Inventor: Boris Regaard, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 278 days.

(21) Appl. No.: 15/848,440

(22) Filed: Dec. 20, 2017

(65) Prior Publication Data

US 2018/0111223 A1  Apr. 26, 2018

Related U.S. Application Data

(63) Continuation of application No. PCT/EP2016/064135, filed on Jun. 20, 2016.

(30) Foreign Application Priority Data

Jun. 29, 2015 (DE) .................. 10 2015 211 999

(51) Int. Cl.
*B23K 26/02* (2014.01)
*B23K 26/064* (2014.01)
(Continued)

(52) U.S. Cl.
CPC .......... *B23K 26/032* (2013.01); *B23K 26/046* (2013.01); *B23K 26/0626* (2013.01);
(Continued)

(58) Field of Classification Search
CPC ........... B23K 26/02–032; B23K 26/064–0652; B23K 26/067–0676; B23K 26/38
See application file for complete search history.

(56) References Cited

U.S. PATENT DOCUMENTS 4,498,742 A * 2/1985 Uehara ............... G03F 7/70091
355/53
5,657,138 A * 8/1997 Lewis .................. B23K 26/032
219/121.73
(Continued)

FOREIGN PATENT DOCUMENTS

CN  1735829  2/2006
CN  101256233  9/2008
(Continued)

OTHER PUBLICATIONS

International Search report and Written Opinion in International Application No. PCT/EP2016/064135, dated Aug. 25, 2016, 17 pages (with English translation).
(Continued)

*Primary Examiner* — Michael A Laflame, Jr.
(74) *Attorney, Agent, or Firm* — Fish & Richardson P.C.

(57) ABSTRACT

A laser processing head comprising a focusing device for focusing a processing laser beam onto a workpiece, the focusing device arranged in a processing beam path, an optical imaging device comprising a detector, wherein the optical imaging device is configured to image observation radiation from a processing region of the workpiece onto the detector along an observation beam path passing through the focusing device, a beam splitter for separating the observation beam path from the processing beam path of the processing laser beam, imaging optics arranged in the observation beam path between the beam splitter and the detector; and a stop arranged between the imaging optics and the detector, wherein the imaging optics produces an image of the stop in the processing beam path of the processing laser beam between the beam splitter and the workpiece.

16 Claims, 4 Drawing Sheets

(51) Int. Cl.
  *B23K 26/38* (2014.01)
  *B23K 26/03* (2006.01)
  *B23K 31/12* (2006.01)
  *B23K 26/06* (2014.01)
  *B23K 26/046* (2014.01)
  *B23K 26/067* (2006.01)

(52) U.S. Cl.
  CPC ...... *B23K 26/0648* (2013.01); *B23K 26/0676* (2013.01); *B23K 26/38* (2013.01); *B23K 31/125* (2013.01)

(56) References Cited

U.S. PATENT DOCUMENTS

| | | | |
|---|---|---|---|
| 5,938,953 | A | 8/1999 | Jurca |
| 6,621,047 | B2 | 9/2003 | Kessler et al. |
| 6,853,493 | B2 | 2/2005 | Kreitzer |
| 8,525,073 | B2 | 9/2013 | Quitter et al. |
| 2002/0008091 | A1* | 1/2002 | Brandinger ............ B23K 26/04 219/121.67 |
| 2002/0040894 | A1* | 4/2002 | Borstel ............ B23K 26/0643 219/121.84 |
| 2002/0080845 | A1* | 6/2002 | Schulz ............ B23K 26/0734 372/108 |
| 2010/0288740 | A1* | 11/2010 | Komiya ............ G02B 26/101 219/121.67 |
| 2016/0114434 | A1 | 4/2016 | Regaard |
| 2016/0280580 | A1* | 9/2016 | Bohme ................ B23K 26/38 |
| 2017/0066079 | A1* | 3/2017 | Reisse ................ B23K 26/046 |
| 2017/0122803 | A1* | 5/2017 | Manger ................ G02B 5/205 |
| 2018/0161925 | A1* | 6/2018 | Harding ................ B33Y 30/00 |
| 2019/0352215 | A1* | 11/2019 | Grundmueller .... B23K 26/0624 |

FOREIGN PATENT DOCUMENTS

| | | |
|---|---|---|
| CN | 103439305 | 12/2013 |
| DE | 19630437 | 1/1998 |
| DE | 10120251 | 11/2002 |
| DE | 102013210078 | 12/2014 |
| EP | 0822027 | 2/1998 |
| EP | 2353769 | 8/2011 |
| JP | H05-245675 | 9/1993 |
| JP | 2000035543 | 2/2000 |
| JP | 2012-252037 | 12/2012 |
| WO | WO 2013/113306 | 8/2013 |
| WO | WO 2015/036140 | 3/2015 |

OTHER PUBLICATIONS

CN Office Action in Chinese Appln. No. 201680038419.3, dated Feb. 26, 2019, 15 pages (with English translation).

JP Office Action in Japanese Appln. No. 2017-568157, dated Mar. 23, 2020, 9 pages (with English translation).

* cited by examiner

LASER-PROCESSING HEAD AND LASER-PROCESSING MACHINE COMPRISING SAME

CROSS REFERENCE TO RELATED APPLICATIONS

This application is a continuation of and claims priority under 35 U.S.C. § 120 from PCT Application No. PCT/EP2016/064135 filed on Jun. 20, 2016, which claims priority from German Application No. DE 10 2015 211 999.8, filed on Jun. 29, 2015. The entire contents of each of these priority applications are incorporated herein by reference.

TECHNICAL FIELD

The present invention relates to a laser processing head.

BACKGROUND

In laser material processing, a processing laser beam is guided along a processing beam path through an optical arrangement consisting of lenses and/or mirrors in a laser processing head and focused onto the workpiece to be machined with a focusing device. For the purposes of observing the process during the laser material processing, a beam splitter (e.g. a wavelength-selective mirror or a scraper mirror) is conventionally arranged in the processing beam path within the laser processing head, where the beam splitter separates the observation beam path from the processing beam path.

By way of example, such a laser processing head is disclosed in DE10120251B4. The laser processing head described therein has a sensor apparatus that includes a spatially resolving receiver arrangement having imaging optics, a stop and a radiation-sensitive receiver. The imaging optics image an area in the region of the interaction zone between the laser beam and the workpiece on the stop, which is on the detector. For the purposes of selecting the detected observation field the stop may be displaceable in at least one direction perpendicular to the optical axis of the imaging optics.

A laser processing head for process observation, in which beams originating from the workpiece are fed to an observation channel by way of a deflection mirror arranged laterally in relation to the processing laser beam, has been disclosed in DE19630437 A1.

In the case of coaxial process observation, the observation beam path passes through the focusing device, often with the beam axis of the processing laser beam coinciding with the optical axis of the observation beam path. Typically, the focusing device has a focusing lens, or consists of a focusing lens, that focuses the processing laser beam onto the workpiece but can result in a number of problems. For example, laser radiation with high power passes through the focusing lens when processing and a thermal lens forms as a result of the absorption of the processing laser radiation in the lens substrate and in the lens coating that is typically present. That is, the refractive index of the substrate is no longer homogeneous but changes with the forming temperature gradient. In the ideal case of a rotationally symmetric distribution of the power of the processing laser beam in the focusing lens, the focusing lens has the greatest temperature at the center and the temperature reduces radially to the outside toward the edge of the lens. If using a $CO_2$ processing laser beam and a zinc selenide lens for focusing the processing laser beam, significant focal length shortenings of the focusing lens of up to 5% occur with increasing laser power and processing duration. If using solid state lasers and quartz optics as a beam source for producing the laser beam, the effect is less pronounced but likewise occurs in the case of large power densities on the focusing lens.

SUMMARY

The aberrations that occur as a result of the formation of a thermal lens can be tolerable for focusing the processing laser beam. However, the thermally induced aberrations are problematic for imaging the processing process coaxially through the focusing lens for process observation, e.g., for the observation radiation. In general, the refractive index gradient formed in the focusing lens causes a deterioration in the imaging properties of the focusing lens, and an optical imaging device arranged in an observation beam path cannot be optimized in a satisfactory manner for different thermal load states of the focusing lens with the optical imaging device serving for coaxial observation of the processing process through the focusing lens.

Problems for the accuracy of observation emerge due to changes in the object distance from the focusing lens, e.g., if workpieces are machined with a changing distance between the laser processing head and the workpiece surface such as when changing between piercing and cutting. Moreover, the object plane not being aligned exactly perpendicular to the laser beam axis (and hence to the observation axis) may be disadvantageous for observation accuracy. Laser processing heads as described herein include a focusing device for focusing a processing laser beam onto a workpiece to be machined, wherein the focusing device is arranged in a processing beam path of the processing laser beam, an optical imaging device, which comprises a detector, wherein the optical imaging device is configured to image observation radiation from a processing region of the workpiece onto the detector along an observation beam path passing through the focusing device, and a beam splitter for separating the observation beam path of the observation radiation from the processing beam path of the processing laser beam. The invention also relates to laser processing machines having such a laser processing head.

The present disclosure describes laser processing heads having an optical imaging device for process observation that advantageously increases the accuracy of the process of observation and makes the observation flexibly adaptable to process conditions.

These advantages are achieved by laser processing heads as described herein in which imaging optics of the optical imaging device is arranged in the observation beam path between the beam splitter and the detector, in which a stop ("far field stop") is arranged between the imaging optics and the detector and spaced apart from the detector, and in which the imaging optics is arranged to produce an image of the stop in the processing beam path of the processing beam between the beam splitter and the workpiece.

The focusing device can include one or more (focusing) lenses and, optionally, one or more reflecting optical elements. Alternatively, the focusing device may have only reflecting optical elements. The detector can be a spatially resolving detector, for example a camera, but it can also be a non-spatially-resolving detector such as a photodiode. The detector is sensitive to the wavelength(s) of the observation radiation, which, for example, may lie in the visible or infrared wavelength range. The central axis of the (focused) processing laser beam typically corresponds to the optical axis of the optical imaging device, and so the processing region is observed coaxially through the focusing lens.

The laser processing head as described herein has an optical imaging device that images an object plane on the detector. The object plane typically coincides with the workpiece surface. What the imaging optics of the optical imaging device achieves is that a delimiting stop for imaging the object plane on the detector, which is arranged in the observation beam path between the beam splitter and the detector, acts as if the stop were arranged in the processing beam path of the processing laser beam (e.g., the imaging optics provides a "virtual stop"). The actual arrangement of a stop for imaging the object plane in the processing beam path of the processing laser beam would be possible only by way of a complicated wavelength-selective embodiment of the stop, because the processing laser beam would have to pass through this stop.

The laser processing heads as described herein contributes to improving the accuracy of the process observation in various ways, depending on the specific position of the image of the stop in the processing beam path.

In some embodiments, the laser processing heads produce the image of the stop in the processing beam path between the focusing device (e.g., a focusing lens of the focusing device), and the workpiece or the object plane of the optical imaging device. If the stop is positioned in the observation beam path or if the laser processing head or the optical imaging device is positioned such that the stop is imaged via the imaging optics between the focusing lens and the object plane of the optical imaging device, it is possible to correct an alignment of the object plane that does not extend perpendicular to the beam axis of the processing laser beam. This correction is possible since the object points of the processing region lying further out are imaged by a lens region lying further in when a virtual stop is arranged between the focusing lens and the workpiece surface as an object plane.

In some embodiments, the laser processing head or the optical imaging device produces the image of the stop in the processing beam path between the beam splitter and the focusing device, (e.g., between the beam splitter and a focusing lens of the focusing device). If the stop is positioned in the observation beam path in such a way that it is imaged by the imaging optics in the processing beam path of the processing laser beam into a section between the beam splitter and a focusing lens of the focusing device (in which the observation radiation typically extends in a collimated fashion), the influence on imaging the object plane of a variation of the processing distance or of a change in focal length of the focusing lens in the case of the thermal load on the focusing lens can be compensated.

The thermal load on the focusing lens leads to a shortening in the focal length thereof, which can be determined by computation depending on the laser power of the processing laser beam radiation. Therefore, the position of the stop in the observation beam path can be selected in such a way that imaging of the object plane on the detector is effectuated in telecentric fashion in the case of a thermally loaded focusing lens. To this end, the position of the stop is selected in such a way that the imaged virtual stop or the image of the stop lies in the focal plane of the thermally loaded focusing lens and telecentric imaging of the process site or of the processing region during the laser processing is achieved in this manner. In the case of telecentric imaging, the magnification does not change with the object distance. An object dimension can be measured reliably, even in the case of a variation in the processing distance. Since the thermal load on the focusing lens varies in the case of different laser powers of the processing beam, a (small) aberration occurs in the telecentric imaging if the position of the stop is not varied in the observation beam path. This aberration can be avoided by displacing the stop and adapting the imaging optics (e.g., displacing at least one of the optical elements of the imaging optics).

In some embodiments, the laser processing head produces the image of the stop in a focal plane of the focusing lens of the focusing device situated between the beam splitter and the focusing lens. In this case, the imaging of the object plane on the detector is effectuated in telecentric fashion in the case of a thermally unloaded focusing lens. In the case of telecentric imaging, all chief rays extend in parallel from the imaged object points, and so there is no change in magnification when there is a change in the object distance. Thus, changes in the object distance from the focusing lens do not have an effect on the imaging in this case.

In some embodiments, the laser processing head or the optical imaging device produces the image of the stop in a focusing lens of the focusing device. If the stop is positioned in the observation beam path in such a way that it is imaged by the imaging optics within the focusing lens, then the imaging of the process site or of the processing region of the workpiece is effectuated as if a real stop were arranged in the focusing lens. Here, the aperture only includes a small, inner region of the focusing lens, in which the thermal load on the focusing lens is uniform. Therefore, all object points of the process site or of the processing region are imaged by the focusing element in such a way that, on the image thereof, substantially the same change in refractive index of the focusing lens becomes effective. In this way, the thermal lens can be equally corrected by a correspondingly optimized imaging optics for all object points.

In some embodiments, the stop is displaceable in the observation beam path and/or (at least) one aperture of the stop is movable perpendicular to the observation beam path (in the plane of the stop). As described above, a displacement of the stop in the observation beam path is advantageous if the focusing lens is thermally loaded. Displacing the stop maintains the image of the stop at the desired location in the processing beam path, e.g. in the focal plane of the thermally loaded focusing lens or in the focusing lens itself, depending on the laser power of the processing beam. Alternatively, or additionally, the stop, or more precisely the aperture of the stop, can be variably positionable in the observation beam path perpendicular to the processing beam path. To this end, the stop can be, for example, displaceable in the plane of the stop and/or rotatable about an axis of rotation eccentric to the aperture and that extends perpendicular to the plane of the stop. As a result of the positionability of the stop transversely to the direction of propagation of the processing beam path or to the optical axis of the processing beam, it is possible to adjust the portion of the focusing lens through which the imaging of the object plane on the detector is effectuated. In this way, it is possible to modify the observation direction or the observation angle.

In some embodiments, the imaging optics is a telescope, for example a Galileo telescope or a Kepler telescope. A Kepler telescope has a first lens and a second lens, which are arranged spaced from one another by the distance of their focal lengths. An intermediate image occurring in the Kepler telescope of the object plane imaged by the optical imaging system simplifies the adjustment of the overall system during assembly and facilitates the masking of interfering stray radiation, as will be described further below. The intermediate image is produced in a focal plane formed between the two lenses of the Kepler telescope, and so the stop ("far field stop") is arranged between the intermediate image and the detector, e.g., in the collimated beam path downstream of the last lens of the telescope. The distance of the stop from the last lens of the telescope determines the position of the virtual stop in the processing beam path.

A further stop can be arranged in a common focal plane between the first lens and the second lens of the Kepler telescope. An additional stop ("near field stop") can be arranged advantageously in the focal plane of the Kepler telescope, wherein the additional stop reduces the influence of interfering stray radiation. Reflected radiation components from the optical elements in the processing beam path of the processing laser beam, (e.g., from the surfaces of the focusing lens), are masked by the additional stop and do not reach the detector.

The first lens and/or second lens of the Kepler telescope in the observation beam path proceeding from the beam splitter can be arranged displaceably in the observation beam path. In the case of a thermally induced focal length change of the focusing lens or in the case of a change in the object distance from the laser processing head, there is a change in the position of the intermediate image between the lenses of the Kepler telescope. By displacing the second lens, it is possible to modify the distance between the Kepler telescope and the stop ("far field stop") in such a way that the intermediate image lies in the focal plane of the second lens again. The observation radiation thus extends in parallel even in the case of a change in the focal length of the focusing lens or in the object distance between the Kepler telescope and the stop, and the observation radiation or the rays of the observation radiation pass through the aperture of the stop in parallel.

The further stop can be displaceable in the observation beam path while coupled to the second lens. A coupled displacement is understood to mean that the distance between the further stop and the second lens remains constant in the case of the displacement, i.e., that these are displaced as a unit. In the case of a thermally induced change in focal length of the focusing lens or in the case of a change in the object distance, the additional stop is arranged in the intermediate image again by displacing the unit made of second lens of the Kepler telescope and additional stop. The additional stop or the second lens is typically displaced by way of an actuator.

As described above, the stop (the "far field stop") may additionally be displaceable in the observation beam path, (e.g., independently of the second telescope lens) and so the image of the stop in the processing beam path always lies in the focal plane of the thermally loaded focusing lens depending on the laser power of the processing beam.

In some embodiments, the optical imaging device includes further optics arranged between the stop and the detector for imaging the processing region onto the detector. By way of example, the optics can include one or more lenses and typically images the object plane or the processing region on the workpiece surface onto the detector together with the focusing unit, (e.g., with the focusing lens).

In some embodiments, the beam splitter is embodied as a wavelength-selective optical element. Typically, the wavelength of the processing laser beam differs from the wavelength of the observation radiation, and so the separation of the observation beam path from the processing beam path by way of a wavelength-selective optical element is possible. Alternatively, the beam splitter can be embodied as a geometric beam splitter, for example as a scraper mirror, which has a central opening through which either the processing laser beam or the observation radiation passes while the observation radiation or the processing beam is deflected at the scraper mirror. The use of other forms of beam splitters is also possible.

A further aspect of the invention relates to laser processing machines having a laser processing head as described herein and a beam source for producing the processing laser beam. By way of example, the beam source can be a $CO_2$ laser, a solid-state laser, (e.g., a disk laser), a diode laser, or other types of laser sources. For the processing of a workpiece, the laser processing machines typically have components in the form of actuators, etc. that facilitate a relative movement between the laser processing head and the workpiece. Typically, it is also possible to adjust the distance between the laser processing head and the workpiece in the case of a laser processing machine. The laser processing machine has an open-loop and/or closed-loop control device for controlling the processing of the workpiece.

Further advantages of the invention emerge from the description and the drawings. Likewise, the features specified above and the features yet to be explained below may find use on their own or together in any combination. The shown and described embodiments should not be understood to make up a comprehensive list but, instead, are exemplary for explaining the invention.

In the following description of the drawings, identical reference signs are used for equivalent or functionally equivalent components.

DETAILED DESCRIPTION

Figure 1:
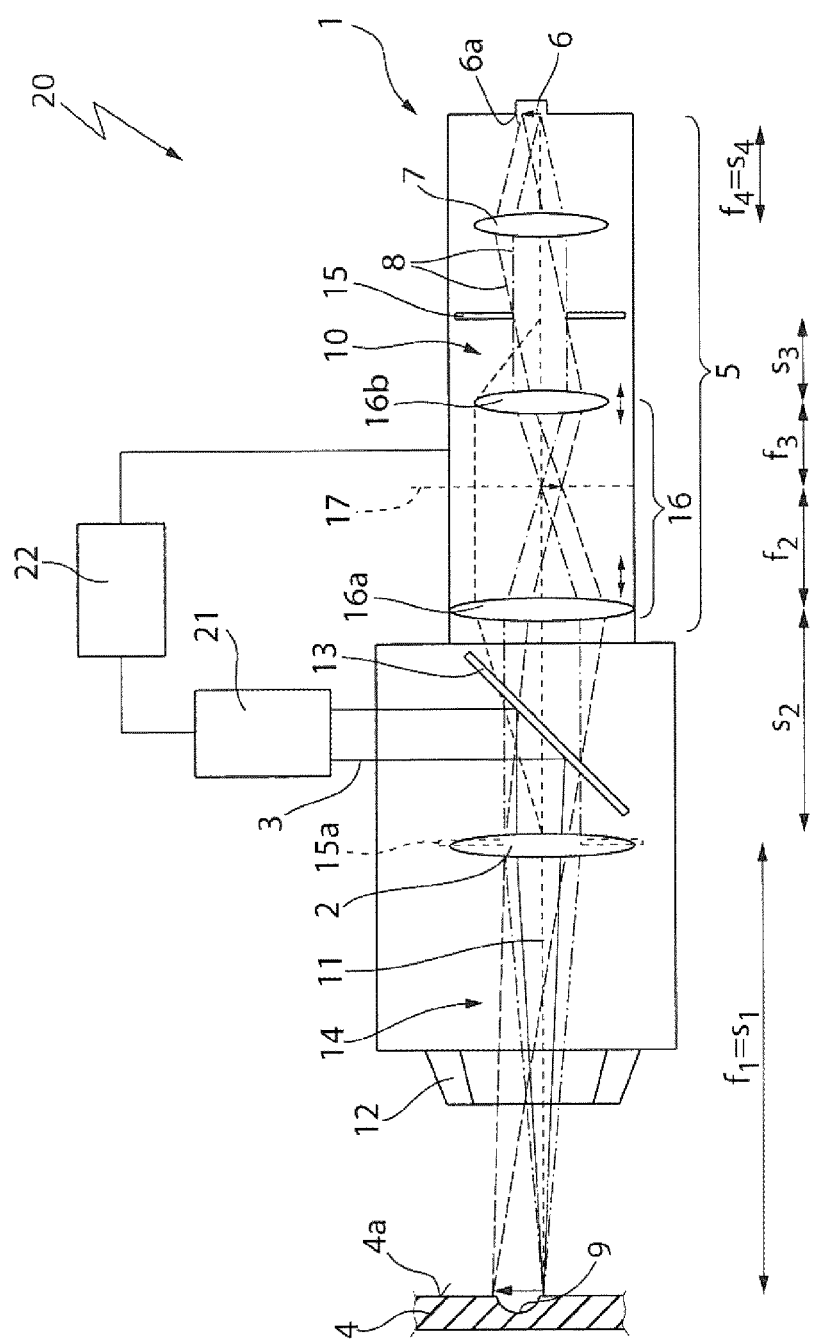
FIG. 1 is a schematic illustration of an example of an embodiment of a laser processing machine having a laser processing head for process observation, wherein the laser processing head has an optical imaging device with a stop that is imaged into a focusing lens.

FIG. 1 shows an example of a structure of a laser processing head 1 as described herein with a focusing device in the form of a focusing lens 2 that focuses a processing laser beam 3 onto a workpiece 4. In the shown example, the workpiece 4 has a workpiece surface 4a at a distance from the focusing lens 2 that corresponds to the focal length $f_1$ or the object distance $s_1$ of the focusing lens 2. The laser processing head 1 moreover has an optical imaging device 5 with a detector 6. Optics 7 in the form of a lens is at the distance of its focal length $f_4$ or object distance $s_4$ from the detector 6. Together with the focusing lens 2, the optics 7 image the workpiece surface 4a (the object plane of the optical imaging device 5), onto an image plane or the radiation-sensitive surface 6a of the detector 6.

Observation radiation 8 (e.g., process radiation), which emanates from a processing region 9 of the workpiece 4, is imaged onto the detector 6 along an observation beam path 10 with the aid of the optical imaging device 5. The observation beam path extends along an optical axis which corresponds to the laser beam axis 11 of the processing laser beam 3 in a section between the focusing lens 2 and the workpiece 4. In the processing region 9, the workpiece 4 is pierced by the processing beam 3 in the example shown; however, other processing processes, such as cutting or welding processing, may be performed on the processing region 9. As shown in FIG. 1, the observation beam path 10 extends from the workpiece 4 through a processing nozzle 12 and through the focusing lens 2 in a manner coaxial to the laser beam axis 11 of the processing laser beam 3. The section of the workpiece 4 in the processing region 9 is imaged on the detector 6 is delimited on the edge by the internal contour of the processing nozzle 12.

Within the laser processing head is a beam splitter 13, which can be a wavelength-selective optical element or a beam splitter mirror with a wavelength-selective coating, that separates the observation beam path 10 of the observation radiation 8 from the processing beam path 14 of the processing laser beam 3. In the example shown, the beam splitter 13 reflects the processing laser beam 3 and transmit the observation radiation 8, which has a different wavelength to the processing laser beam 3. In some embodiments, the deflection of the processing laser beam 3 at the beam splitter 13 may be depend on the type of the wavelength-selective coating and can be at an angle other than 90°.

The optical imaging device 5 has an imaging optics in the form of a Kepler telescope 16, which has a first lens 16a in the observation beam path 10 from the beam splitter 13 to the detector 6 and a second lens 16b in the observation beam path 10 from the beam splitter 13 to the detector 6. The first lens 16a of the Kepler telescope 16 has focal length $f_2$ and the second lens 16b of the Kepler telescope 16 with the focal length $f_3$. The two lenses are arranged at a distance from one another corresponding to the sum of their focal lengths $f_2+f_3$. The Kepler telescope 16 produces an image 15a in the focusing lens 2 of a stop 15. The distance $s_3$ between the stop 15 and the second lens 16b corresponds to the focal length $f_3$ of the second lens 16b and it is matched to the distance $s_2$ between the first lens 16a and the focusing lens 2 in such a way that the stop 15 is imaged in focus into the focusing lens 2. As may likewise be seen in FIG. 1, the stop 15 is imaged in the focusing lens 2 in a magnified manner due to the Kepler telescope 16.

The image 15a of the stop 15 acts on the imaging of the processing region 9 on the detector 6 by the optical imaging device 5 as if the stop 15 were arranged in the focusing lens 2 in the processing beam path 14 of the processing laser beam 3. The aperture of the image 15a of the stop 15 in this case only has a small, radially interior region of the focusing lens 2, in which the thermal load on the focusing lens 2 is distributed in a uniform or homogeneous manner. Therefore, only object points of the processing region 9, for the imaging of which substantially the same refractive index change of the focusing lens 2 becomes effective, are imaged, and so the thermal lens does not have a substantial effect on the imaging of the processing region 9 on the detector 6.

The laser processing head 1 shown in FIG. 1 is used to carry out a laser processing process for processing the workpiece 4 in a laser processing machine 20. The laser processing machine 20 has a beam source 21 for producing the processing laser beam 3 and further components, not illustrated for simplification, which facilitate the workpiece processing, e.g., the generation of a relative movement between the laser processing head 1 and the workpiece 4.

The beam source 21 can be a $CO_2$ laser source, a solid-state laser source, a diode laser source or a different type of laser source.

In the shown example, the second lens 16b of the Kepler telescope 16 is displaceable along the observation beam path 10, more precisely along the optical axis 11, by an actuator (not shown here), as indicated in FIG. 1 by a double-headed arrow. In the case of a change in focal length of the focusing lens 2, caused for thermal reasons, or in the case of a change of the distance 51 between the workpiece 4 and the focusing lens 2 of the laser processing head 1, there is a change in the position of the intermediate image of the processing region 9 which is produced without such a thermal lens or load in a common focal plane 17 between the two lenses 16a, 16b of the Kepler telescope 16. By displacing the second lens 16b of the Kepler telescope 16, the intermediate image once again lies in the focal plane 17 of the second lens 16b and the beam is collimated downstream of the lens 16b and passes through the stop 15 in collimated fashion. Additionally, the stop 15 may likewise be arranged in a displaceable manner in the observation beam path 10 to correct the error in the position of the virtual stop 15a, which arises from the change in focal length of the focusing lens 2 caused by thermal reasons.

Figure 2:
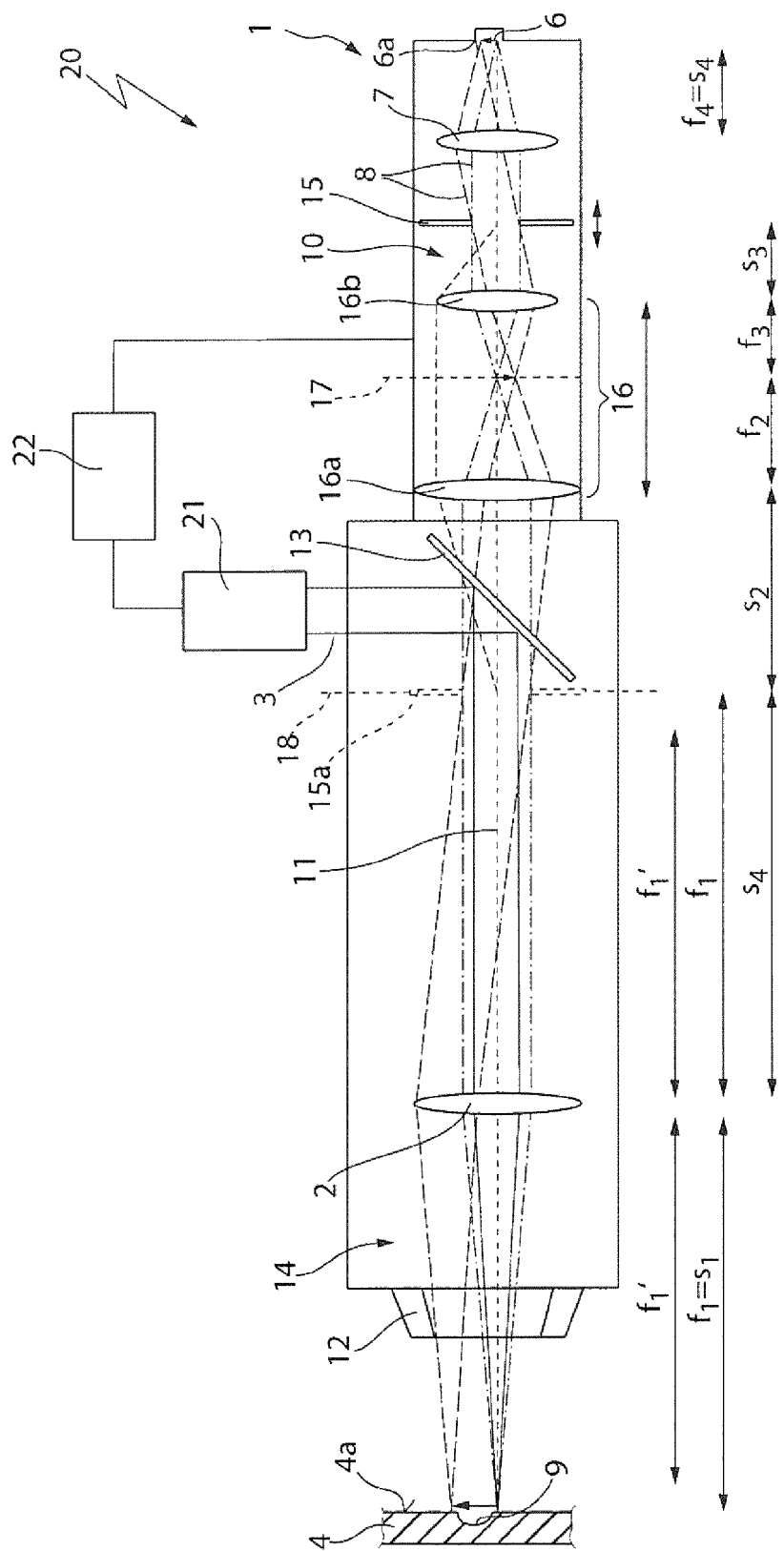
FIG. 2 is a schematic illustration of another embodiment of a laser processing machine where the stop is imaged into a focal plane of the focusing lens.

A laser processing head 1, which likewise facilitates an improved process observation, is illustrated in FIG. 2. The laser processing head 1 shown in FIG. 2 differs from the laser processing head 1 shown in FIG. 1 by virtue of the imaging optics (e.g., Kepler telescope 16) imaging the stop 15 not into the focusing lens 2, but into the processing beam path 14 of the processing laser beam 3 between the focusing lens 2 and the beam splitter 13. Specifically, the image 15a is imaged onto the (image-side) focal plane 18 of the focusing lens 2 as shown, with the object-side and image-side focal lengths $f_1$ of the focusing lens coinciding. Both the processing laser beam 3 and the observation radiation 8 are collimated between the beam splitter 13 and the focusing lens 2. When arranging the image 15a of the stop 15 in the focal plane 18 of the focusing lens 2, the object plane or the workpiece surface 4a is imaged in a telecentric manner on the detector 6 by the optical imaging device 5, if the focusing lens 2 is not loaded or only slightly loaded thermally.

An intermediate image of the workpiece surface 4a (the object plane) that contains the processing region 9 is produced by the focusing lens 2 in the focal plane 18 of that faces away from the workpiece 4. The image 15a of the stop 15 is produced in the focal plane 18. Changes in the object distance $s_1$, (in the distance between the workpiece surface 4a and the focusing lens 2), do not affect the imaging in this case since the magnification does not change with the object distance in the case of telecentric imaging so that the imaged region of the workpiece surface 4a containing the processing region 9 remains unchanged.

To compensate for the influence of the focal length change of the focusing lens 2 in the case of a thermal load on the imaging of the workpiece surface 4a or of the processing region 9, the stop 15 is arranged in the observation beam path 14 in such a way that the Kepler telescope 16 images the stop at a position in the observation beam path 10 which lies between the focal plane 18 of the thermally unloaded focusing lens 2 and the focusing lens 2 itself. The thermal load on the focusing lens 2 leads to a shortened focal length $f_1'$ compared to the focal length $f_1$ in the thermally unloaded state; this length can be determined by computation, depending on the strength of the laser power. Therefore, if the laser power is known, the position of the stop 15 in the observation beam path 10 can be selected such that the image 15a of the stop 15 lies in the focal plane (not shown here), displaced in the direction of the focusing lens 2, of the thermally loaded focusing lens 2 with a shortened focal length $f_1'$, and so there is telecentric imaging of the processing region 9 or the workpiece surface 4a onto the detector 6, even during the laser processing. To maintain the image 15a of the stop 15 in the focal plane 18 of the focusing lens 2, the stop 15 and either the Kepler telescope 16 or at least one of the telescope lenses 16a, 16b optionally may be displaced with the aid of one or more actuators (not shown here) in the observation beam path 10.

On the basis of a model of the focal length $f_1$, $f_1'$ of the focusing lens 2 that depends on the laser power of the processing laser beam 3, a control device 22 of the laser processing machine 20 can always set the displacement path of the stop 15 and of the Kepler telescope 16 or of the first telescope lens 16a or the second telescope lens 16b in such a way that the image 15a of the stop 15 is imaged in the focal plane 18 of the focusing lens 2, the focal plane varying in terms of its position along the beam axis 11 of the processing laser beam 3. Displaceability of the stop 15 is not necessary if the errors in the positioning of the virtual stop 15a as a result of the thermally induced change in focal length of the focusing lens 2 are small.

Figure 3:
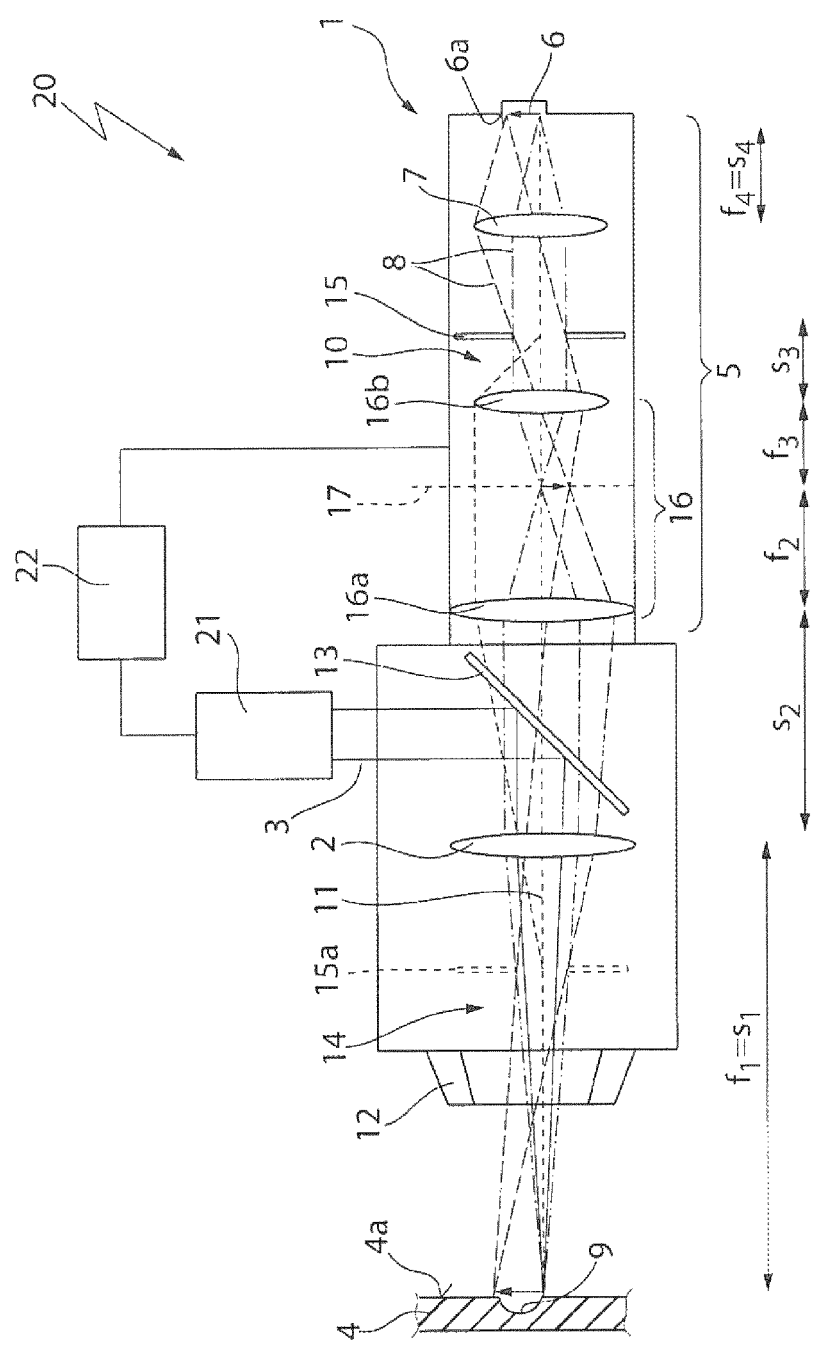
FIG. 3 is a schematic illustration of another embodiment of a laser processing machine where the stop is imaged between the focusing lens and a workpiece surface.

FIG. 3 shows a laser processing machine 20 having a laser processing head 1, in which the imaging optics in the form of the Kepler telescope 16 produces an image 15a of the stop 15 between the focusing lens 2 and the workpiece surface 4a in the processing beam path 14 of the processing laser beam 3. By this imaging it is possible to correct an object plane or workpiece plane 4a that is not perpendicular to the beam axis 10 of the processing laser beam 3 since the object points of the processing region 9 at the workpiece surface 4a lying further to the outside are imaged by a lens region of the focusing lens 2 lying further to the inside in the case where the image 15a of the stop 15 is positioned between the workpiece 4 and the focusing lens 2.

Figure 4:
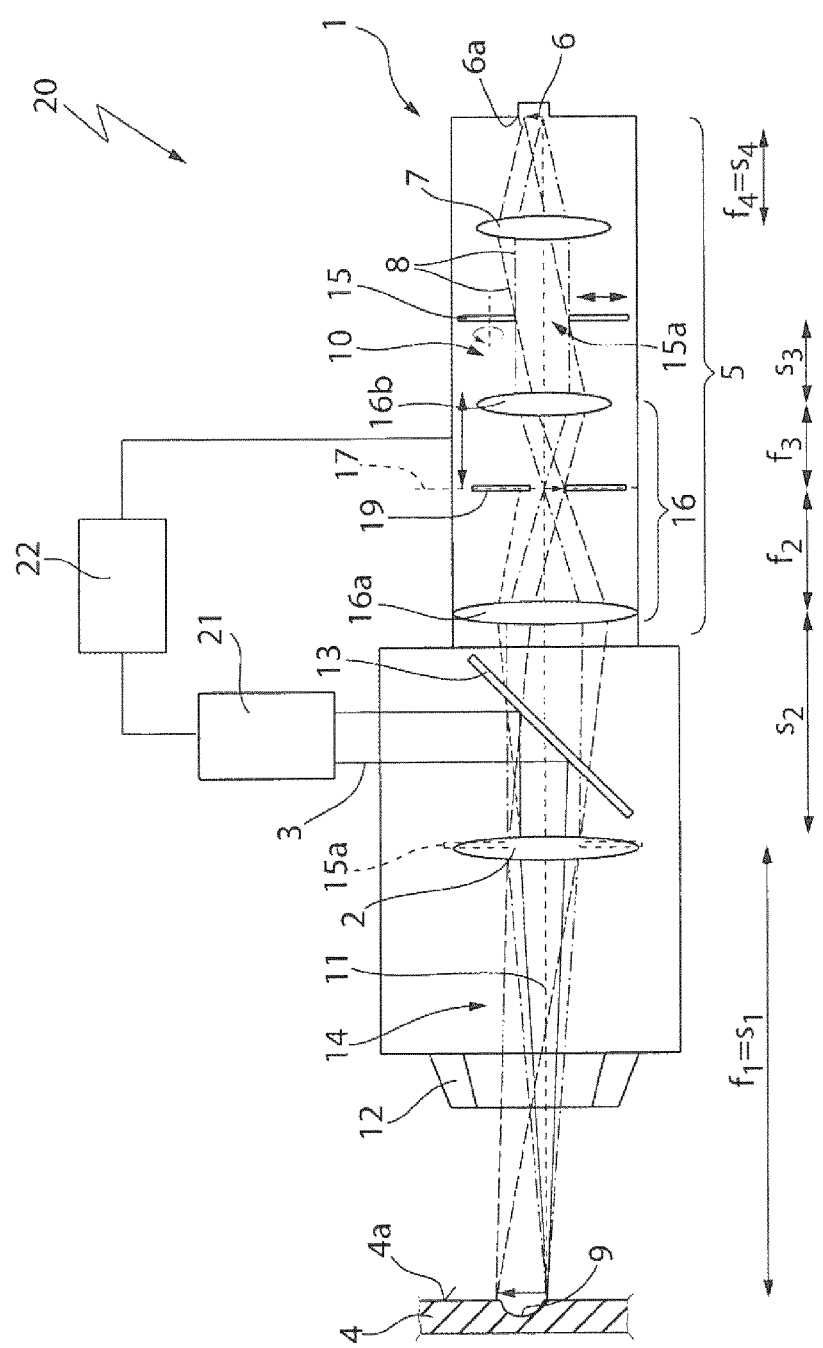
FIG. 4 is a schematic illustration of another embodiment of a laser processing machine where a further stop is arranged in a focal plane between a first lens and a second lens of a Kepler telescope of the optical imaging device.

In the example shown in FIG. 4, the stop 15 is imaged into the focusing lens 2. In contrast to the laser processing head 1 shown in FIG. 1, the Kepler telescope 16 of the optical imaging device 5 has a further stop 19 ("near field stop") in a focal plane 17 of the Kepler telescope 16 between the first lens 16a and the second lens 16b. The further stop 19 serves to reduce the influence of parasitic stray radiation on the imaging. Reflected radiation components from optical elements in the processing beam path 14 of the processing laser beam 3, e.g., from the surfaces of the focusing lens 2 which are not reflected at a parallel angle to the chief ray of the observation radiation 8, are masked by the further stop 19 and do not reach the detector 6.

In the laser processing head 1 shown in FIG. 4, the further stop 19 and the second lens 16b are coupled to one another and displaceable in the observation beam path 10, and can be displaced without changing their relative spacing along the optical axis 11 of the observation beam path 10. An actuator, which is indicated by a double-headed arrow in FIG. 4, may serve for the common displacement of the further stop 19 and the second lens 16b. In a manner analogous to the example shown in FIG. 1, in the example shown in FIG. 4, by displacing the unit made of second lens 16b and further stop 19, the further stop 19 can be arranged exactly in the intermediate image in the focal plane 17 of the Kepler telescope 16 that has been displaced along the optical axis 11 in the case of a thermally induced change in the focal length $f_1$ of the focusing lens 2 or in the case of a change in the object distance $s_1$.

Moreover, in the laser processing head 1 shown in FIG. 4, the stop 15 is perpendicular to the observation beam path 10, or to the optical axis 11 thereof, (displaceable in the plane of the stop) in the observation beam path 10. By displacing the stop 15, it is possible to set the portion of the focusing lens 4 by which the imaging of the processing region 9 on the detector 6 is effectuated. In this way, it is possible to change the observation direction or the observation angle. The stop 15 may alternatively or additionally be rotated about an axis of rotation extending parallel to the optical axis 11, as a result of which it is likewise possible to adjust the position of an aperture of the stop 15 in the stop plane.

The accuracy of the process observation during the laser material processing (for example during laser cutting or laser welding) is thus improved. Additionally, the process observation can be flexibly adapted to the process conditions where necessary. It is understood that the imaging optics 16 need not necessarily be embodied as a Kepler telescope and it may also have reflecting optical elements in addition to transmitting optical elements or, where necessary, it may consist of reflecting optical elements only. Additionally, the beam splitter 13 is not necessarily embodied as a wavelength-selective optical element but may be embodied, for example, as a geometric beam splitter, e.g. in the form of a scraper mirror or the like. The focusing device need not necessarily consist of a focusing lens but may, for example, have a lens group for focusing the processing laser beam 3 or contain, or consist of, reflecting optical elements. It is understood that the examples explained further above apply analogously in the case of a focusing device in the form of a lens group, wherein the focal length $f_1$ of the focusing lens 2 is replaced by the overall focal length of the lens group for the observations above. Additionally, the lenses 16a, 16b of the imaging optics 16 naturally may be embodied as lens groups, wherein the respective focal lengths $f_2$ and $f_3$ of the lenses 16a, 16b are replaced by the overall focal length of the respective lens group for the observations made above. The control of the displacement of the lenses 16a, 16b of the imaging optics 16, the control of the displacement or movement of the stop 15 and, optionally, of the further stop 19 is effectuated by the control device 22 of the laser processing machine 20. To this end, the control device 22 can, where necessary, resort to information about the thermally induced focal length change in the focusing lens 2.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A laser processing head comprising:
  a focusing device for focusing a processing laser beam onto a workpiece to be machined, wherein the focusing device is arranged in a processing beam path of the processing laser beam;
  an optical imaging device comprising a detector, wherein the optical imaging device is configured to image observation radiation from a processing region of the workpiece onto the detector along an observation beam path passing through the focusing device;
  a beam splitter for separating the observation beam path from the processing beam path;

an imaging optics arranged in the observation beam path between the beam splitter and the detector;

a stop arranged between the imaging optics and the detector, wherein the stop is spaced apart from the detector, and wherein the imaging optics is configured to produce an image of the stop in the processing beam path of the processing laser beam between the beam splitter and the workpiece; and a further optics arranged between the stop and the detector, the further optics being configured to image the processing region of the workpiece onto the detector.

2. The laser processing head of claim 1, wherein the imaging optics is configured to produce the image of the stop in the processing beam path between the focusing device and the workpiece.

3. The laser processing head of claim 1, wherein the imaging optics is configured to produce the image of the stop in the processing beam path between the beam splitter and the focusing device.

4. The laser processing head of claim 3, wherein the imaging optics is configured to produce the image of the stop in a focal plane of a focusing lens of the focusing device situated between the beam splitter and the focusing lens.

5. The laser processing head of claim 1, wherein the imaging optics is configured to produce the image of the stop within a focusing lens of the focusing device.

6. The laser processing head of claim 1, wherein the stop is displaceable in the observation beam path.

7. The laser processing head of claim 1, wherein an aperture of the stop is movable perpendicular to the observation beam path.

8. The laser processing head of claim 1, wherein the imaging optics comprises a telescope.

9. The laser processing head of claim 8, wherein the telescope is a Kepler telescope.

10. The laser processing head of claim 9, further comprising a second stop arranged in a common focal plane between a first lens and a second lens of the Kepler telescope.

11. The laser processing head of claim 10, wherein the first lens or the second lens, or both the first lens and the second lens of the Kepler telescope in the observation beam path from the beam splitter to the detector are displaceable in the observation beam path.

12. The laser processing head of claim 9, wherein a second stop is displaceable in the observation beam path while coupled to the second lens.

13. The laser processing head of claim 1, further comprising a second optics arranged between the stop and the detector, wherein the second optics is configured to image the processing region of the workpiece onto the detector.

14. A laser processing machine comprising:

a laser processing head comprising:

a focusing device for focusing a processing laser beam onto a workpiece to be machined, wherein the focusing device is arranged in a processing beam path of the processing laser beam;

an optical imaging device comprising a detector, wherein the optical imaging device is configured to image observation radiation from a processing region of the workpiece onto the detector along an observation beam path passing through the focusing device;

a beam splitter for separating the observation beam path of the observation radiation from the processing beam path of the processing laser beam;

imaging optics arranged in the observation beam path between the beam splitter and the detector; and a stop arranged between the imaging optics and the detector, wherein the stop is spaced apart from the detector, and wherein the imaging optics is configured to produce an image of the stop in the processing beam path of the processing laser beam between the beam splitter and the workpiece, a further optics arranged between the stop and the detector, the further optics being configured to image the processing region of the workpiece onto the detector, and a beam source for producing the processing laser beam.

15. The laser processing head of claim 1, wherein the further optics is a lens.

16. The laser processing machine of claim 14, wherein the further optics is a lens.

* * * * *